(12) United States Patent
Wilmot

(10) Patent No.: US 10,918,192 B1
(45) Date of Patent: Feb. 16, 2021

(54) SUPPORT DEVICE FOR A MANNEQUIN COMPONENT AND A MANNEQUIN ASSEMBLY

(71) Applicant: Julie Wilmot, Wall Township, NJ (US)

(72) Inventor: Julie Wilmot, Wall Township, NJ (US)

( * ) Notice: Subject to any disclaimer, the term of this patent is extended or adjusted under 35 U.S.C. 154(b) by 204 days.

(21) Appl. No.: 15/921,884

(22) Filed: Mar. 15, 2018

Related U.S. Application Data

(60) Provisional application No. 62/478,939, filed on Mar. 30, 2017.

(51) Int. Cl.
G09B 19/10 (2006.01)
A45D 44/14 (2006.01)
G09B 19/00 (2006.01)

(52) U.S. Cl.
CPC ......... *A45D 44/14* (2013.01); *G09B 19/0076* (2013.01)

(58) Field of Classification Search
CPC ............................ G09B 19/0076; G09B 19/10
USPC ................... 434/94; 248/121, 125.8, 226.11; 403/322.1, 322.2, 322.3, 322.4, 325; 446/376, 391, 394
See application file for complete search history.

(56) References Cited

U.S. PATENT DOCUMENTS

| | | | |
|---|---|---|---|
| 2,968,104 A * | 1/1961 | Ito ........................... | G09B 25/00 434/94 |
| 3,288,415 A * | 11/1966 | Eickhoff .............. | F16M 13/025 248/231.71 |
| 3,424,419 A * | 1/1969 | Siegel .................... | A45D 44/14 248/231.71 |
| 3,448,957 A | 6/1969 | Friedman et al. | |
| 3,596,862 A * | 8/1971 | Block .................... | A45D 44/14 248/121 |
| 3,934,804 A * | 1/1976 | Bruce .................... | A45D 44/14 248/229.15 |
| 5,054,729 A * | 10/1991 | Mogi ..................... | A45D 44/14 248/118 |
| 5,228,570 A * | 7/1993 | Robinson ................ | B25H 3/06 206/375 |
| 5,819,892 A * | 10/1998 | Deliman .............. | A45C 13/262 190/115 |
| 6,109,921 A | 8/2000 | Yau | |
| 6,155,441 A * | 12/2000 | Andersen ............. | A47B 47/021 211/192 |
| 6,471,231 B1 * | 10/2002 | Hargroder ........... | A61G 5/1024 188/2 F |

(Continued)

*Primary Examiner* — Kurt Fernstrom
(74) *Attorney, Agent, or Firm* — William J. Connelly, III; Maldjian Law Group LLC

(57) ABSTRACT

A support device includes an outer shaft having a first end and a second end. The support device also includes an inner shaft adjustably coupled to the outer shaft. The support device further includes a mounting rod pivotally attached to the inner shaft and removably coupled to a mannequin component. The mounting rod includes a plurality of attachment nubs spaced apart from each other along a length of the mounting rod. The plurality of attachment numbs are further angularly spaced apart from each other with respect to a central axis of the mounting rod. The support device also includes a release button, which, upon actuation, is configured to move each of the plurality of attachment nubs from an extended position to a retracted position to allow the mannequin component to be movable relative to the mounting rod.

14 Claims, 5 Drawing Sheets

(56) References Cited

U.S. PATENT DOCUMENTS

| | | | | |
|---|---|---|---|---|
| 7,654,027 B1* | 2/2010 | Grover | ............... | F16B 21/165 |
| | | | | 24/573.11 |
| 7,905,676 B2* | 3/2011 | Halder | ............... | F16B 19/109 |
| | | | | 403/322.2 |
| 8,516,732 B2* | 8/2013 | Burnsed, Jr. | ............ | F41C 23/02 |
| | | | | 24/573.11 |
| 9,447,815 B2* | 9/2016 | Roberts | ............... | F16B 45/00 |
| 9,812,102 B2* | 11/2017 | de Chadenedes | ...... | G10G 5/005 |
| 10,548,388 B2* | 2/2020 | Koerten | ............... | G09B 19/003 |
| 2002/0011196 A1 | 1/2002 | Floyd, II et al. | | |
| 2013/0022395 A1 | 1/2013 | Cowan | | |
| 2015/0118654 A1 | 4/2015 | Phillips | | |

* cited by examiner

SUPPORT DEVICE FOR A MANNEQUIN COMPONENT AND A MANNEQUIN ASSEMBLY

CROSS-REFERENCE TO RELATED APPLICATIONS

This application claims the benefit of U.S. Provisional Application Ser. No. 62/478,939, filed Mar. 30, 2017, entitled "Interlocking Mannequin Head and Stand," which is incorporated herein by reference in its entirety.

FIELD OF THE INVENTION

Embodiments of the present disclosure generally relate to a support device for a mannequin component and a mannequin assembly including the support device.

BACKGROUND

Many cosmetology students rely on mannequin heads as demonstration aids and practice tools. However, current mannequin heads frequently do not remain attached to their stands or get covered in dye and cosmetic products when the student attempts to move the mannequin head. Current mannequin head support stands also cannot position the mannequin head in lifelike positions, such as in a shampoo sink, or simulate lifelike head movements.

Generally, a mannequin head support stand includes a rod which stands upright. The rod may be fixed to a table or a stand. Typically, a mannequin head includes a neck with an opening extending up through the base of the neck towards the head. The rod is inserted into the opening of the mannequin head. However, this configuration is often not stable. The head may move or fall off the rod while the hair on the mannequin head is being styled.

For the foregoing reasons, there is a need for a mannequin head support stand with a locking mechanism and pivotable attachment points.

SUMMARY

Embodiments of the present disclosure provide a support device for use with a mannequin component, such as a mannequin head or a mannequin torso. The support system includes a mounting rod pivotally attached to an inner shaft, which is further adjustably coupled to an outer shaft. The outer shaft may be vertically oriented relative to a supporting surface, for example, a floor or a table.

Embodiments in accordance with the present disclosure provide a support device for supporting a mannequin component, the support device including an outer shaft supported by a stand or a clamp, and an inner shaft adjustably coupled to the outer shaft. The support device also includes a mounting rod pivotally attached to the inner shaft and removably coupled to the mannequin component. The mounting rod enables the mannequin component to be pivoted relative to the outer shaft.

Embodiments in accordance with the present disclosure provide a support device for use with a mannequin component, the support device including a mounting rod removably coupled to the mannequin component. Further, the mounting rod includes a plurality of attachment nubs spaced apart from each other along a length of the mounting rod to securely attach the mannequin component with the support device.

Embodiments in accordance with the present disclosure further provide a support device for use with a mannequin component, the support device including a mounting rod removably coupled to the mannequin component. Further, the mounting rod includes a plurality of attachment nubs angularly spaced apart from each other to securely attach the mannequin component with the support device.

Embodiments in accordance with the present disclosure provide a support device for use with a mannequin component, the support device including an outer shaft and a tripod to support the outer shaft. Further, the tripod is adjustably attached to the outer shaft.

Embodiments in accordance with the present disclosure also provide a support device for use with a mannequin component, the support device including a clamp configured to secure the support device to an external component.

Embodiments in accordance with the present disclosure further provide a support device for use with a mannequin component, the support device including a hook configured to removably secure one or more weighted members to provide stability to the mannequin component.

Embodiments in accordance with the present disclosure provide a support device for use with a mannequin component, the support device including a pedal configured to adjust a height of the support device relative to a supporting surface.

Embodiments in accordance with the present disclosure provide a support device for use with a mannequin component, the support device including an outer shaft and a swivel grip extending from the outer shaft. The swivel grip is configured to rotate the outer shaft about a central axis.

Embodiments of the present disclosure provide a support device for use with a mannequin component. The support device includes an outer shaft having a first end and a second end. The support device also includes an inner shaft adjustably coupled to the outer shaft. The inner shaft extends from the first end of the outer shaft. The support device further includes a mounting rod pivotally attached to the inner shaft and removably coupled to the mannequin component. The mounting rod includes a plurality of attachment nubs spaced apart from each other along a length of the mounting rod. The plurality of attachment numbs are further angularly spaced apart from each other with respect to a central axis of the mounting rod. The support device also includes a release button disposed on the mounting rod. The release button, upon actuation, is configured to move each of the plurality of attachment nubs from an extended position to a retracted position to allow the mannequin component to be movable relative to the mounting rod.

Embodiments in accordance with the present invention are directed to a mannequin assembly including a mannequin component. The mannequin component includes a cavity defining a plurality of openings. The mannequin assembly also includes an outer shaft having a first end and a second end. The outer shaft is oriented vertically with respect to a supporting surface. The mannequin assembly further includes an inner shaft adjustably coupled to the outer shaft. The inner shaft extends from the first end of the outer shaft. The mannequin assembly also includes a mounting rod pivotally attached to the inner shaft and removably received within the cavity of the mannequin component. The mounting rod includes a plurality of attachment nubs spaced apart from each other. Further, each of the plurality of attachment nubs is removably received within a corresponding opening of the plurality of openings of the mannequin component. The mannequin assembly also includes a release button disposed on the mounting rod. The release button, upon actuation, is configured to move each of the plurality of attachment nubs from an extended position to a retracted position to allow the mannequin component to be movable relative to the mounting rod.

Embodiments in accordance with the present invention are further directed to a support device for use with a mannequin component. The support device includes an outer shaft having a first end and a second end. The support device also includes a tripod adjustably coupled to the outer shaft. The support device further includes an inner shaft adjustably coupled to the outer shaft. The inner shaft extends from the first end of the outer shaft. The support device also includes a mounting rod pivotally attached to the inner shaft and removably coupled to the mannequin component. The mounting rod includes a plurality of attachment nubs spaced apart from each other along a length of the mounting rod. The plurality of attachment nubs are further angularly spaced apart from each other with respect to a central axis of the mounting rod. The support device further includes a handle extending from the inner shaft. The handle is configured to pivotally adjust the mounting rod relative to the inner shaft. The support device also includes a release button disposed on the mounting rod. The release button, upon actuation, is configured to move each of the plurality of attachment nubs from an extended position to a retracted position to allow the mannequin component to be movable relative to the mounting rod.

Embodiments of the present disclosure may provide a number of advantages depending on its particular configuration. It is an object of the present disclosure to provide a support device for use with a mannequin component, which can be interlocked with the mannequin component and is configured to allow pivotal movement of the mannequin component to provide teaching aid for individuals studying cosmetology.

These and other advantages will be apparent from the present application of the embodiments described herein.

The preceding is a simplified summary to provide an understanding of some embodiments of the present disclosure. This summary is neither an extensive nor exhaustive overview of the present disclosure and its various embodiments. The summary presents selected concepts of the embodiments of the present disclosure in a simplified form as an introduction to the more detailed description presented below. As will be appreciated, other embodiments of the present disclosure are possible utilizing, alone or in combination, one or more of the features set forth above or described in detail below.

BRIEF DESCRIPTION OF THE DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following figures.

Figure 1:
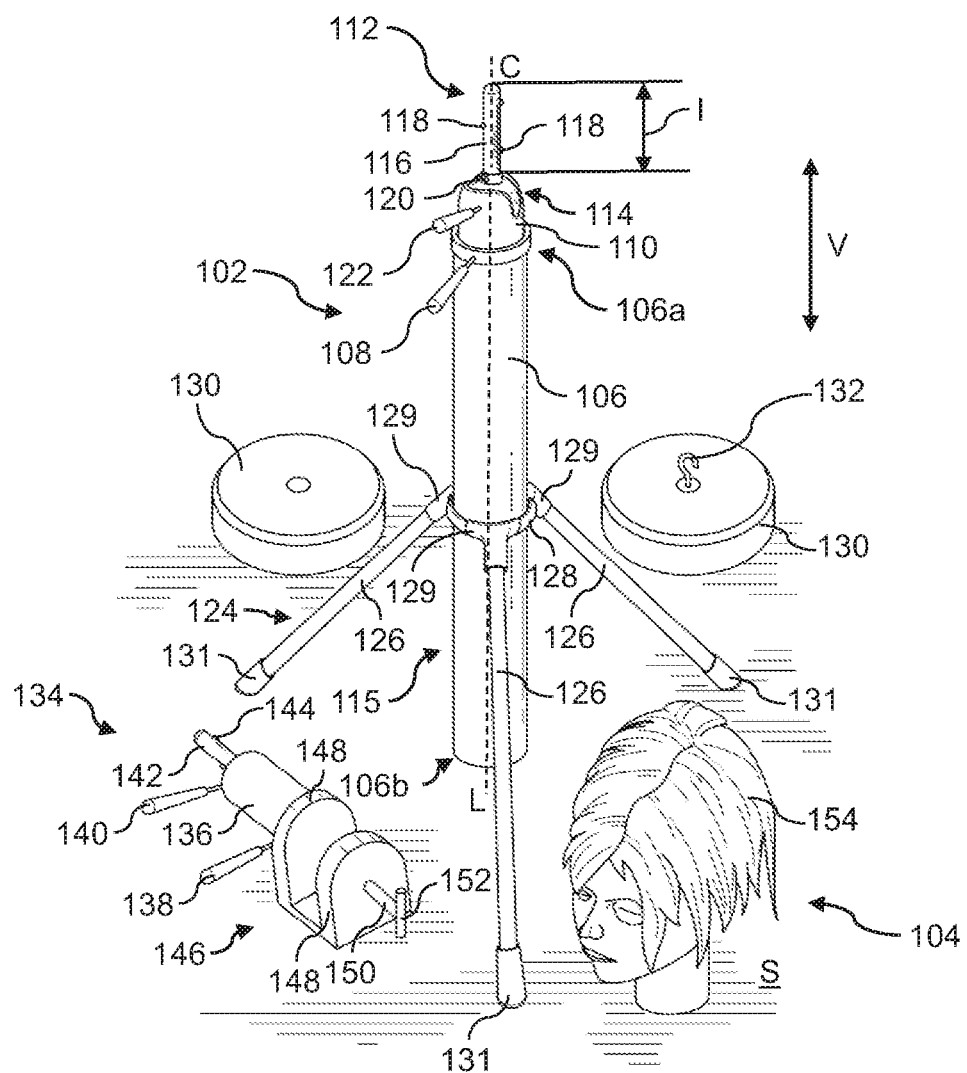
FIG. 1 illustrates a perspective view of a mannequin system, according to an embodiment of the present invention.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the particular form disclosed, but to the contrary, the present disclosure is to cover all modifications, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present disclosure will be described below in conjunction with exemplary supporting devices for mannequin components and mannequin assemblies including the supporting devices.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

FIG. 1 illustrates a perspective view of a mannequin system 100, according to an embodiment of the present invention. The mannequin system 100 includes a support device 102 and a mannequin component 104. The mannequin system 100 is illustrated in a disassembled state in FIG. 1. In an assembled state, the mannequin component 104 is attached to the support device 102 to form a mannequin assembly (shown in FIG. 5). In an exemplary embodiment, the support device 102 includes an outer shaft 106 having a first end 106a and a second end 106b opposite to the first end 106a. In some embodiments, the outer shaft 106 may have a hollow cylindrical structure. In some embodiments, the outer shaft 106 may be vertically aligned with respect to a supporting surface "S". Therefore, the outer shaft 106 is a vertical shaft. Further, the supporting surface "S" may be a floor or a table. In some embodiments, the support device 102 may include a swivel grip 108 configured to rotate the outer shaft 106 about a longitudinal axis "L". The outer shaft 106 may extend substantially parallel to the longitudinal axis "L". In an embodiment, the swivel grip 108 may extend perpendicularly from the first end 106a of the outer shaft 106. Therefore, the swivel grip 108 may be oriented substantially perpendicular relative to the longitudinal axis "L".

The support device 102 also includes an inner shaft 110 adjustably coupled to the outer shaft 106. The longitudinal axis "L" may be defined by the outer shaft 106 and/or the inner shaft 110. In an exemplary embodiment, a diameter of the inner shaft 110 may be less than and or equal to a diameter of the outer shaft 106. The inner shaft 110 may extend from the first end 106a of the outer shaft 106. Further, the inner shaft 110 may extend substantially parallel to the longitudinal axis "L". In an embodiment, the inner shaft 110 may have a hollow cylindrical structure. In alternative embodiments, the inner shaft 110 may have a solid configuration. In an embodiment, a length of the inner shaft 110, extending from the outer shaft 106, may be adjustable, such as via a telescopic movement. Therefore, a length of a shaft assembly including the inner shaft 110 and the outer shaft 106 may be telescopically adjustable.

In some embodiments, the outer shaft 106 is rotatably engaged with the inner shaft 110, such that the inner shaft 110 is configured to rotate about the longitudinal axis "L". In a further embodiment, the inner shaft 110 may be rotatable by 360 degrees about the longitudinal axis "L". Moreover, the inner shaft 110 may be rotatable with respect to the outer shaft 106. In an embodiment, the swivel grip 108 may be used to rotate the inner shaft 110 about the longitudinal axis "L". In another embodiment, the outer shaft 106 and the inner shaft 110 are configured to rotate together about the longitudinal axis "L". Further, the outer shaft 106 and inner shaft 110 may be rotatable by 360 degrees about the longitudinal axis "L". In such a case, the inner shaft 110 and the outer shaft 106 may be rotatably locked with each other. Further, the swivel grip 108 may be used to rotate the outer shaft 106 and the inner shaft 110 about the longitudinal axis "L".

The support device 102 also includes a mounting rod 112 pivotally attached to the inner shaft 110. In an exemplary embodiment, the mounting rod 112 is configured to be removably coupled to the mannequin component 104. The mounting rod 112 may be pivotally attached to the inner shaft 110 via a ball joint 114. The mounting rod 112 may include an elongate structure. In an embodiment, the mounting rod 112 may have a length "l". In an exemplary embodiment, the mounting rod 112 may include a body 116 and a plurality of attachment nubs 118. The attachment nubs 118 may selectively extend from the body 116 of the mounting rod 112. In some embodiment, the attachment nubs 118 are spaced apart from each other along the length "l" of the mounting rod 112. Further, the attachment nubs 118 are angularly spaced apart from each other with respect to a central axis "C" of the mounting rod 112. In the embodiment illustrated in FIG. 1, the central axis "C" is oriented substantially parallel to the longitudinal axis "L". However, the central axis "C" may be inclined with respect to the longitudinal axis "L" based on a pivotal adjustment of the mounting rod 112. In some embodiments, the body 116 may define a plurality of holes (not shown). Each of the attachment nubs 118 may selectively extend from a corresponding hole of the body 116. In an embodiment, each of the attachment nubs 118 is further movable between an extended position (as shown in FIG. 1) and a retracted position. In the extended position, each of the attachment nubs 118 may extends outwardly from the corresponding hole of the body 116. Therefore, in the extended position, each of the attachment nubs 118 may extend from an outer surface of the body 116. In the retracted position, each of the attachment nubs 118 may be disposed within the body 116 of the mounting rod 112. In some embodiments, each of the attachment nubs 118 may be normally spring biased towards the extended position. Further, each of the attachment nubs 118 is configured to move inside the corresponding hole when an external force is applied. Therefore, in the absence of an external force, each of the attachment nubs 118 remain in the extended position.

In an exemplary embodiment, the support device 102 also includes a release button 120 disposed on the mounting rod 112. The release button 120 may be disposed at an end of the mounting rod 112 proximal to the ball joint 114. In some embodiments, the release button 120 may be spring loaded and is configured to simultaneously move each of the attachment nubs 118 within the corresponding holes of the mounting rod 112. In some embodiments, the release button 120 may be connected to each of the attachment nubs 118 via a linkage mechanism, such that the release button 120, upon actuation, may move each of the attachment nubs 118 from the extended position to the retracted position. The movement of each of the attachment nubs 118 from the extended position to the retracted position may allow the mannequin component 104 to be moveable relative to the mounting rod 112. In an embodiment, the mannequin component 104 may be linearly movable along the central axis "C". In another embodiment, the mannequin component 104 may be rotatable about the central axis "C".

The support device 102 also includes a handle 122 extending from the inner shaft 110. In some embodiments, the handle 122 is configured to pivotally adjust the mounting rod 112 relative to the inner shaft 110. The mounting rod 112 may be rotatable about an axis "D" that is substantially perpendicular to the central axis "C". In an embodiment, the handle 122 may extend perpendicularly from the inner shaft 110. Therefore, the handle 122 may be oriented substantially perpendicular relative to the central axis "C". The handle 122 may enable pivotal adjustment of the mounting rod 112 relative to the inner shaft 110 as per requirements. In some embodiments, the handle 122 may be attached to a pivot ball (not shown in FIG. 1) of the ball joint 114 via any attachment method. Example of the attachment method may include, but not limited to, brazing, welding, adhesive, fasteners and so forth.

The outer shaft 106, the inner shaft 110 and the mounting rod 112 may together constitute a support stand 115 that is configured to support the mannequin component 104. The support device 102 also includes a tripod 124 adjustably coupled to the outer shaft 106 proximal to the second end 106b. In another embodiment, the tripod 124 may be adjustably coupled to the outer shaft 106 at the second end 106b. The tripod 124 may support the support stand 115 on the supporting surface "S". In some embodiments, the tripod 124 may allow the adjustment of the outer shaft 106 along a vertical direction "V". Specifically, the tripod 124 may allow the outer shaft 106 to be adjusted along the longitudinal axis "L". The tripod 124 may maintain a high rigidity of the outer shaft 106. The tripod 124 includes three legs 126 attached to a circular bracket 128. Each leg 126 may include a rubber capping 131 which may inhibit any change in a position of the tripod 124 when placed on a slippery surface. The circular bracket 128 may be disposed around an outer surface of the outer shaft 106. In some embodiments, the legs 126 may be attached to the circular bracket 128 via corresponding joints 129. The joints 129 may allow the corresponding legs 126 to spread or fold in order to change a height of the outer shaft 106 relative to the supporting surface "S". In an embodiment, each of the joints 129 may allow an angular movement between the circular bracket 128 and the corresponding leg 126. The legs 126 are therefore pivotally movable with respect to the outer shaft 106. In some embodiments, the joints 129 may also lock the legs 126 at an appropriate position to provide a suitable height to the outer shaft 106 as per requirements.

In further embodiments, the circular bracket 128 may be slidable along the length of the outer shaft 106. A position of the circular bracket 128 along the length of the outer shaft 106 may determine the height of the outer shaft 106 relative to the supporting surface "S". The circular bracket 128 may also be locked at a selected position to prevent relative movement between the circular bracket 128 and the outer shaft 106. Based on a position of the circular bracket 128 on the outer shaft 106, the legs 126 may spread or fold to allow the outer shaft 106 to be located at a suitable height with respect to the supporting surface "S". In a further embodiment, each of the legs 126 may also be extendable or retractable with respect to the circular bracket 128.

In some embodiments, the support device 102 may also include a pedal (not shown in FIG. 1) configured to adjust the height of the outer shaft 106 relative to the supporting surface "S". In an embodiment, the pedal may extend from the second end 106*b* of the outer shaft 106. In some embodiments, the pedal may extend perpendicularly from the second end 106*b* and is operably connected to the outer shaft 106, such that the pedal is adapted to adjust the height of the outer shaft 106. In an embodiment, the pedal, upon actuation, may allow relative movement between the circular bracket 128 and the outer shaft 106 along the longitudinal axis "L". In another embodiment, the pedal, upon actuation, may allow angular movement of the legs 126 relative to the outer shaft 106 so that the height of the outer shaft 106 relative to the supporting surface "S" can be adjusted.

In some embodiments, the support device 102 may also include a hook (not shown in FIG. 1) attached to the second end 106*b* of the outer shaft 106. The hook may be configured to removably secure one or more weighted members 130 to the outer shaft 106. In some embodiments, the hook may be attached to the second end 106*b* of the outer shaft 106 via an extending device (not shown), such as a rod or a wire. The one or more weighted members 130 may provide stability to the mannequin component 104 when attached to the mounting rod 112. As illustrated in FIG. 1, the mannequin system 100 includes only two weighted members 130. However, the mannequin system 100 may include any number of weighted member 130 based on requirements. In an exemplary embodiment, one of the weighted member 130 is provided with a weight hook 132 that may be coupled with the hook of the outer shaft 106. The weight hook 132 may be centrally disposed on a surface of the weighted member 130. Further, another weighted member 130 may include a cavity that may be attached to the outer shaft 106 via a wire or an extending rod. In an exemplary embodiment, each of the weighted members 130 is disc-shaped. Embodiments are intended to include or otherwise cover any shape and size of the weighted members 130 based on requirements.

In an alternative embodiment, the mannequin component 104 may be supported by another support device 134. The support device 134 may include an outer shaft 136, an inner shaft (not shown), a swivel grip 138, a handle 140 and a mounting rod 142 similar to the support device 102. The mounting rod 142 of the support device 134 may also include multiple attachment nubs 144 similar to the attachment nubs 118 of the mounting rod 112. Each corresponding component of the support device 134 may also operate in a similar manner. However, the support device 134 may include a clamp 146 instead of the tripod 124. The clamp 146 may be attached to a second end of the outer shaft 136. Further, the clamp 146 may be adjustably coupled the outer shaft 136. In an embodiment, the outer shaft 136 may be rotatable with respect to the clamp 146. In a further embodiment, the outer shaft 136 may be extendable or retractable with respect to the clamp 146. In an embodiment, the clamp 146 may be configured to removably secure the outer shaft 136 to an external component (not shown). The external component can be, but not limited to, a table, a stand or a counter. In an embodiment, the clamp 146 includes two jaws 148 that can be adjusted by a clamping rod 150. In some embodiments, one of the jaws 148 is fixed to the outer shaft 136 at the second end, while another jaw 148 is moveable to adjust a distance between the two jaws 148 and securely attach the outer shaft 136 to the external component. The clamping rod 150 may be at least partially threaded so that a rotation of the clamping rod 150 may result in an adjustment of a distance between the two jaws 148. A handle 152 may be coupled to the clamping rod 150 to facilitate rotation of the clamping rod 150.

In the embodiment illustrated in FIG. 1, the mannequin component 104 may be a mannequin head. The mannequin component 104 may present a full replica of a human face including eyes, nose, mouth etc. The mannequin component 104 may further represent a human head that is realistically and naturally shaped, and present a cosmetically attractive appearance. The mannequin component 104 further includes a neck portion. In an alternative embodiment, the mannequin component 104 may additionally include an upper chest portion (not shown) of a human torso. In some embodiments, the mannequin component 104 may include a wig 154 mounted atop the mannequin component 104. The wig 154 may simulate hair for practicing various cosmetic exercises, such as dying, shampooing, cutting etc. Alternatively, the mannequin component 104 may include hair that is attached to the mannequin component 104. In an exemplary embodiment, the mannequin component 104 may define a cavity (not shown in FIG. 1). Further, the cavity may define a plurality of openings corresponding to the attachment nubs 118 or the attachment nubs 144. The mannequin component 104 may be at least partially hollow in order to define the cavity with the openings.

Figure 2:
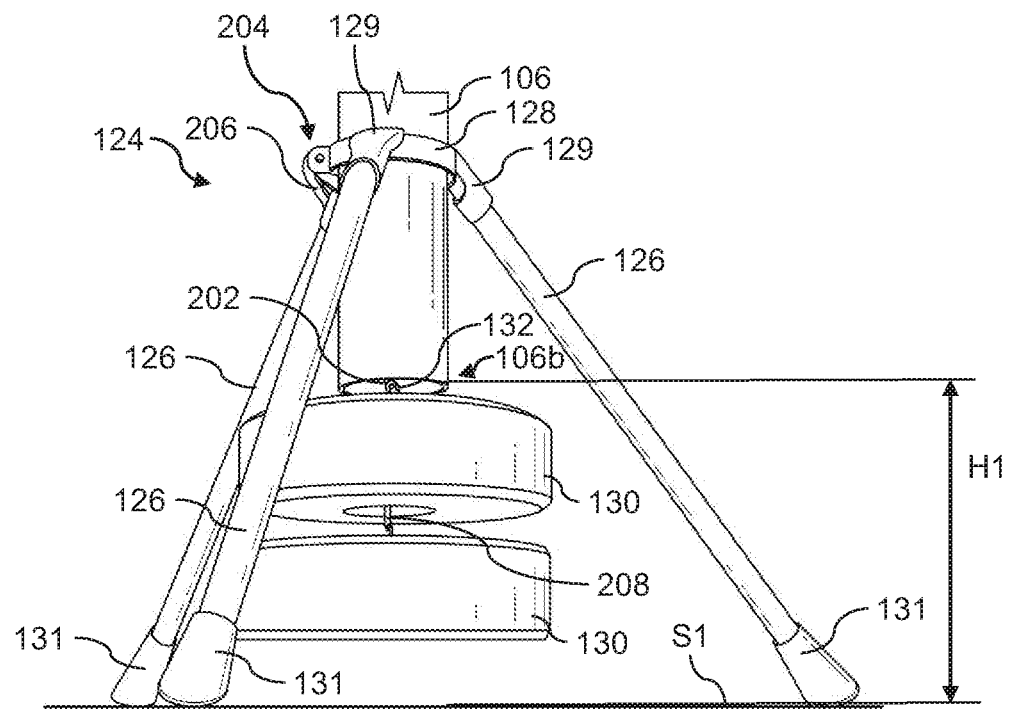
FIG. 2 illustrates a partial perspective view of a support device for use with a mannequin component, according to an embodiment of present invention.

FIG. 2 illustrates a partial perspective view of the support device 102, according to an embodiment of present invention. The support device 102 includes the outer shaft 106. In an exemplary embodiment, the outer shaft 106 may be vertically oriented with respect to a supporting surface "S1". Therefore, the outer shaft 106 may be a vertical shaft. In an embodiment, the outer shaft 106 may have a hollow elongate structure. Further, the outer shaft 106 may have a circular cross section. In some embodiments, the outer shaft 106 may be adjustably coupled to the inner shaft 110 (shown in FIG. 1). In an embodiment, the outer shaft 106 may include a hook 202 extending downwards from the second end 106*b* of the outer shaft 106. The hook 202 may be adapted to removably secure the weighted member 130 to the support device 102. The support device 102 also includes the tripod 124 for supporting the outer shaft 106 on the supporting surface "S1".

The tripod 124 includes the three legs 126 attached to the circular bracket 128. Each of the legs 126 may include the rubber capping 131 which may inhibit any change in a position of the tripod 124 when placed on a slippery surface.

The circular bracket 128 may be disposed around the outer surface of the outer shaft 106. In some embodiments, the legs 126 may be attached to the circular bracket 128 via the corresponding joints 129. The joints 129 may allow the corresponding legs 126 to spread or fold to change a height "H1" of the outer shaft 202 relative to the supporting surface "S1".

In an exemplary embodiment, the support device 102 may also include a pedal 204. In an embodiment, the pedal 204 may extend perpendicularly from the second end 106b of the outer shaft 106. In another embodiment, the pedal 204 may extend perpendicularly proximal to the second end 106b of the outer shaft 106. The pedal 204 may therefore extend perpendicularly with respect to the longitudinal axis "L". Further, the pedal 204 is operably connected to the outer shaft 106 to adjust the height "H1" of the outer shaft 106 relative to the supporting surface "S1". In an embodiment, the pedal 204, upon actuation, may allow relative movement between the circular bracket 128 and the outer shaft 106 along the longitudinal axis "L". Specifically, the pedal 204 may allow the circular bracket 128 to move along the outer surface of the outer shaft 106 to adjust the height "H1" of the outer shaft 106. In an embodiment, the pedal 204 may be operatively coupled to the outer shaft 106 and/or the circular bracket 128 via one or more links 206. In a normal position, the pedal 204 may lock the tripod 124 at a desired height. Upon application of an external force, the pedal 204 may move from the normal position, and allow adjustment of the tripod 124. Therefore, the height "H1" can be adjusted as per requirements. The one or more links 206 may allow movement of the pedal 204 from the normal position. Further, the one or more links 206 may bias the pedal 204 to the normal position when the external force is removed from the pedal 204. Therefore, the outer shaft 106 is retained at a desired height. In an embodiment, the pedal 204 may lock the circular bracket 128 at an appropriate position on the outer surface of the outer shaft 106. Further, the pedal 204 may allow movement of the circular bracket 128 along the outer surface of the outer shaft 106 upon actuation.

The support device 102 may also include the two weighted members 130 detachably attached at the second end 106b of the outer shaft 106. In an embodiment, the weighted member 130 proximal to the outer shaft 106 may include the weight hook 132 detachably coupled to the hook 202 of the outer shaft 202. In an embodiment, the weighted member 130 distal from the outer shaft 106 may be attached to the other weighted member 130 via any suitable attachment methods. The attachment methods may include, but not limited to, hooks, extending rods, wires and so forth. In the illustrated embodiment of FIG. 2, the weighted member 130 are connected to each other via one or more wires 208. In some embodiments, the weighted members 130 may provide stability to the support device 102 during use. In the illustrated embodiment of FIG. 2, the support device 102 includes two of the weighted members 130. However, embodiments are intended to include any number of weighted members as per requirements.

Figure 3:
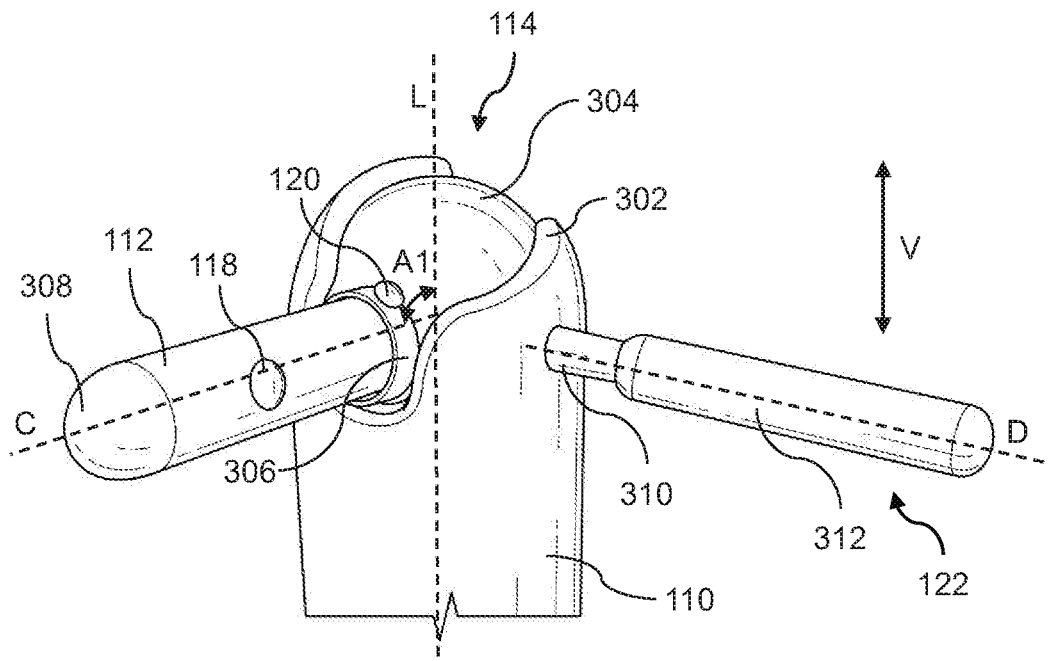
FIG. 3 illustrates another partial perspective view of the support device, according to an embodiment of the present invention.

FIG. 3 illustrates another partial perspective view of the support device 102, according to an embodiment of the present invention. The support device 102 includes the inner shaft 110 adjustably coupled to the outer shaft 106 (shown in FIGS. 1 and 2). The inner shaft 110 may be telescopically received within the outer shaft 106. The inner shaft 110 may include a rim 302 at a top end of the inner shaft 110. The rim 302 may define an end opening at the top end of the inner shaft 110. In some embodiments, the rim 302 may determine movement of the mounting rod 112 along one or more axes.

The mounting rod 112 is attached to the inner shaft 110 via the ball joint 114. A pivot ball 304 of the ball joint 114 is at least partially received within the end opening of the inner shaft 110. Further, the mounting rod 112 is secured to the pivot ball 304 via a ring 306. The mounting rod 112 may have a cylindrical shape with a substantially hemispherical end 308. In other embodiment, the mounting rod 112 may be secured to the pivot ball 304 via any suitable attachment methods, for example, but not limited to, brazing, welding, adhesive, fasteners and so forth. In an embodiment, the mounting rod 112 may be rotatably coupled to the pivot ball 304. This may enable the mounting rod 112 to be rotatable about the central axis "C". The mounting rod 112 includes the attachment nubs 118 (only one shown in FIG. 3). Further, the release button 120 is disposed adjacent to the ball joint 114 at the top end of the inner shaft 110. The release button 120 may protrude from an aperture (not shown) of the ring 306. In an embodiment, the release button 120 may have a hemispherical shape.

The support device 102 also includes the handle 122 extending from the inner shaft 110. In some embodiments, the handle 122 is configured to pivotally adjust the mounting rod 112 relative to the inner shaft 110. In an exemplary embodiment, the handle 122 may be configured to pivotally adjust the mounting rod 112 about the axis "D". In the illustrated embodiment of FIG. 3, the mounting rod 112 is inclined with respect to the longitudinal axis "L" of the inner shaft 110. Therefore, the central axis "C" is inclined by an angle "A1" with respect to the longitudinal axis "L". In an embodiment, the handle 122 may extend perpendicularly from the inner shaft 110. Therefore, the handle 122 may be oriented substantially perpendicular relative to the longitudinal axis "L". The handle 122 includes an elongate member 310 coupled to the pivot ball 304 and an outer grip 312 at least partially enclosing the elongate member 310. In some embodiments, the elongate member 310 may be attached to the pivot ball 304 via any attachment method. Example of the attachment method may include, but not limited to, brazing, welding, adhesive, fasteners and so forth. The handle 122 may be rotatable about the axis "D" to pivotally adjust the mounting rod 112 relative to the inner shaft 110 as per requirements. Specifically, upon rotating the outer grip 312 about the axis "D", the elongate member 310 and the pivot ball 304 also rotate about the axis "D". Consequently, the mounting rod 112 also rotates about the axis "D" along with the pivot ball 304. The rim 302 of the inner shaft 110 may define angular limits of the pivotal movement of the mounting rod 112 about the axis "D". The angular limits defined by the rim 302 may be selected to imitate lifelike movements of a human head and/or torso. The mounting rod 112 may also be adjustable about the longitudinal axis "L" due to the rotational movement of the inner shaft 110 about the longitudinal axis "L". Therefore, the mannequin component 104 (shown in FIG. 1), that is removably attached to the mounting rod 112, may be rotatable in a lifelike manner about the axis "D" and the longitudinal axis "L". Further, the mannequin component may also be linearly movably along the vertical direction "V" due to the movement of the inner shaft 110 along the longitudinal axis "L".

Figure 4:
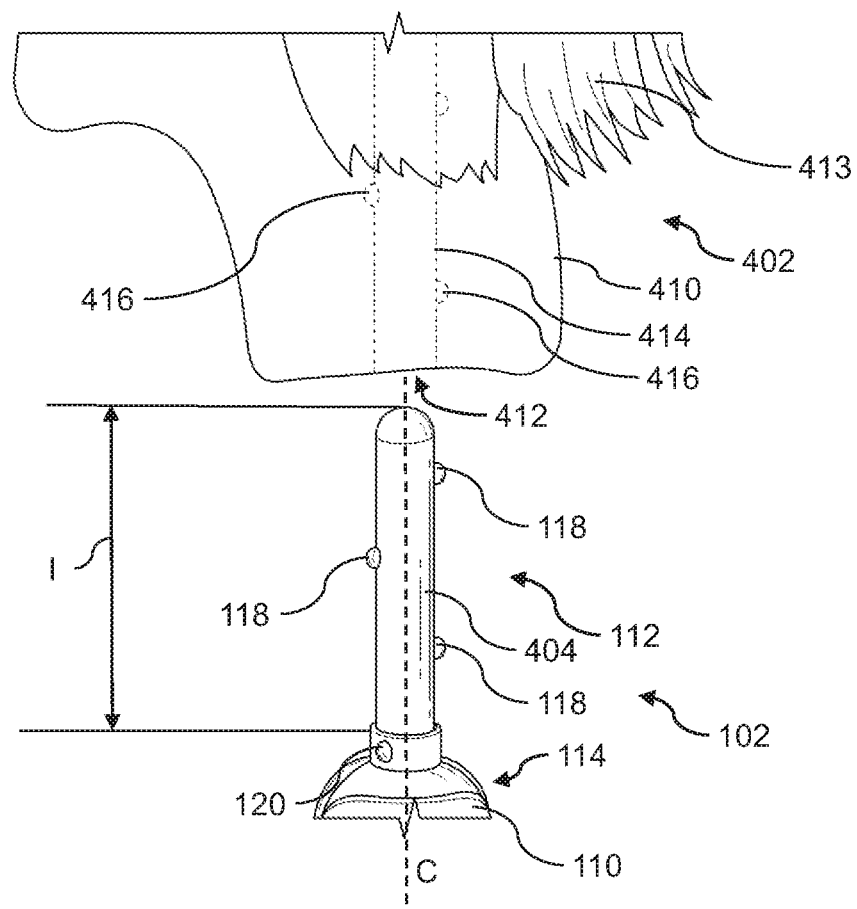
FIG. 4 illustrates a partial perspective view of the support device along with a mannequin component, according to an embodiment of present invention.

FIG. 4 illustrates a partial perspective view of the support device 102 along with a mannequin component 402, according to an embodiment of present invention. The support device 102 include the mounting rod 112 pivotally attached to an inner shaft (not shown in FIG. 4). The mounting rod 112 includes the attachment nubs 118 spaced apart from each other along the length "l" of the mounting rod 112. The attachment nubs 118 are therefore linearly spaced apart from each other along the central axis "C" of the mounting rod 112. The attachment nubs 118 are further angularly spaced apart from each other with respect to the central axis "C" of the mounting rod 112. Each of the attachment nubs 118 may have a hemispherical shape. Each of the attachment nubs 118 may extend perpendicularly from an outer surface 404 of the mounting rod 112. In an embodiment, each of the attachment nubs 118 is movable between an extended position (as shown in FIG. 4) and a retracted position. In the extended position, each of the attachment nubs 118 extends outwardly from the surface 404 of the mounting rod 112. In the retracted position, each of the attachment nubs 118 may be disposed within the mounting rod 112. In some embodiments, each of the attachment nubs 118 may be normally spring biased towards the extended position. Further, each of the attachment nubs 118 is configured to move inside the mounting rod 112 when an external force is applied. Therefore, in the absence of an external force, each of the attachment nubs 118 remain in the extended position.

In an exemplary embodiment, the support device 102 also includes the release button 120 disposed on the mounting rod 112. The release button 120 may be disposed at the end of the mounting rod 112 proximal to the ball joint 114. In some embodiments, the release button 120 may be spring loaded and is configured to simultaneously move each of the attachment nubs 118 within the mounting rod 112. In some embodiments, the release button 120 may be connected to each of the attachment nubs 118 via the linkage mechanism, such that the release button 120, upon actuation, may move each of the attachment nubs 118 from the extended position to the retracted position. The movement of each of the attachment nubs 118 from the extended position to the retracted position may allow the mannequin component 402 to be moveable relative to the mounting rod 112. In an embodiment, the mannequin component 402 may be linearly movable along the central axis "C". In another embodiment, the mannequin component 402 may be rotatable about the central axis "C".

The mannequin component 402 includes a body 410 defining a cavity 412. In the illustrated embodiment, the mannequin component 402 may be a mannequin head and includes hair 413. The mannequin component 402 may be substantially similar to the mannequin component 104 (shown in FIG. 1). The cavity 412 includes a cylindrical portion 414 configured to at least partially receive the mounting rod 112 therein. The cavity 412 further includes a plurality of openings 416 disposed adjacent to the cylindrical portion 414. Each of the attachment nubs 118 of the mounting rod 112 is removably received within the corresponding opening 416 of the mannequin component 402. Each of the openings 416 may have a shape that is complementary to the shape of the corresponding attachment nubs 118. In an embodiment, each of the openings 416 may have a hemispherical shape. The release button 120, upon actuation, is configured to move each of the attachment nubs 118 from the extended position to the retracted position to allow the mannequin component 402 to be movable relative to the mounting rod 112.

In order to removably couple the mannequin component 402 to the mounting rod 112, the release button 120 is actuated by a user. The release button 120 may be actuated by pressing the release button 120. The release button 120 moves each of the attachment nubs 118 to the retracted position within the mounting rod 112. The mounting rod 112 is then insertable within the cavity 412 of the mannequin component 402 such that the mounting rod 112 is at least partially received within the cylindrical portion 414, and each of the attachment nubs 118 is aligned with the corresponding opening 416. The release button 120 may be then released so that each of the attachment nubs 118 move back to the extended position and is received within the corresponding opening 416. The mannequin component 402 is therefore removably secured to the mounting rod 112. The mannequin component 402 and the support device 102, upon attachment with each other, may form a mannequin assembly. In order to detach the mannequin component 402 from the mounting rod 112, the release button 120 is again actuated, and the mannequin component 402 moved away from the mounting rod 112. Therefore, the release button 120, upon actuation, is adapted to depress the each of the attachment nubs 118 to allow the mannequin head to be removed from the mounting rod 112.

Figure 5:
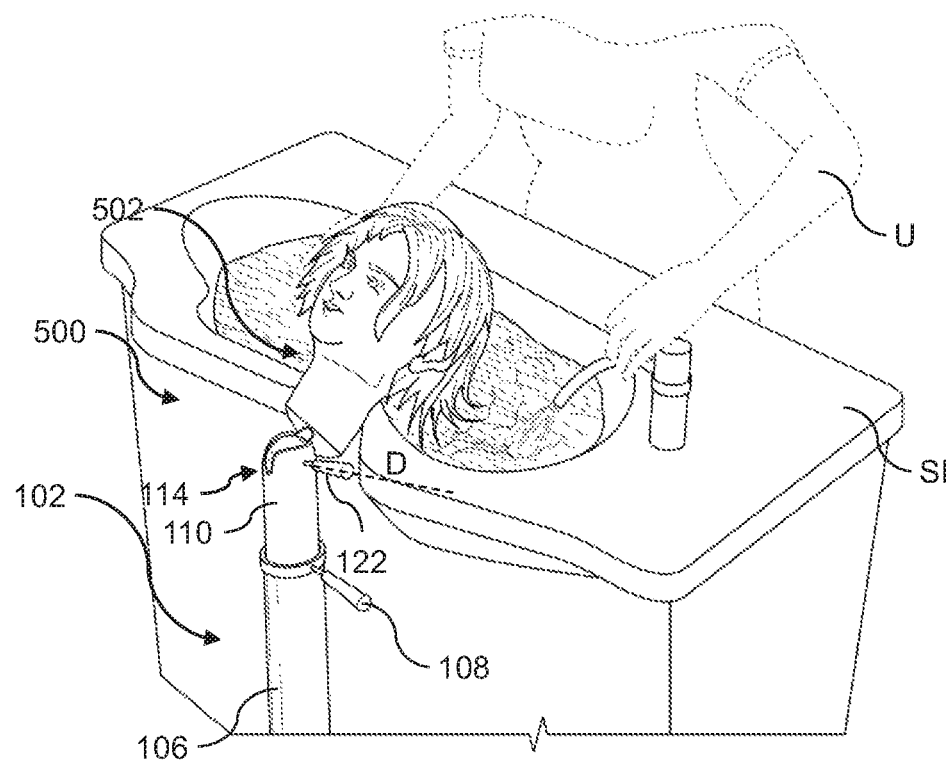
FIG. 5 illustrates a partial perspective view of the support device in use with a mannequin component, according to an embodiment of present invention.

FIG. 5 illustrates a partial perspective view of the support device 102 in use with a mannequin component 502. The support device 102 and the mannequin component 502 may form a mannequin assembly 500. The mannequin component 502 may be a mannequin head that is substantially similar to the mannequin component 104 (shown in FIG. 1). In use, a user "U" may removably secure the mannequin component 502 to the support device 102 via the mounting rod 112 (shown in FIGS. 1, 3 and 4) including the attachment nubs 118. The mannequin component 502 may be then pivoted to a desired position, such as in a shampoo sink "SI", by manipulating the handle 122 and the swivel grip 108. Specifically, the user "U" can adjust the mannequin component 502 by pivoting the handle 122 about the axis "D" and/or rotating the inner shaft 110 about the longitudinal axis "L" via the swivel grip 108. The user "U" can therefore adjust the mannequin component 502 without holding the mannequin component 502. This may prevent undesired contact between the mannequin component 502, and dye or cosmetic products. Further, the user "U" may manipulate the mannequin component 502 without undesired contact with dye or cosmetic products. The mannequin component 502 is also securely attached to the inner shaft 110 via the attachment nubs 118, thereby preventing accidental detachment during use. The outer shaft 106 may also be adjusted to a desired height, thereby allowing the mannequin component 502 to be located at a suitable height as per requirements. The user "U" can then practice their cosmetology skills on the mannequin component 502. When finished, the user "U" can actuate the release button 120 (shown in FIGS. 1, 3 and 4) to depress the attachment nubs 118, allowing the mannequin component 104 to be removed from the mounting rod 112. The support device 102 including the support stand 115 (shown in FIG. 1) and the tripod 124 may therefore allow the mannequin component 502 to be adjusted to lifelike positions. Alternatively, the support device 134 (shown in FIG. 1) may be used to clamp the mannequin component 502 to an external component (e.g., the shampoo sink "SI"), and allow the mannequin component 502 to be adjusted to various positions.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The exemplary embodiments of this present invention have been described in relation to a support device for a mannequin component and a mannequin assembly including the support device. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention. Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A support device for use with a mannequin component, the support device comprising:
    an outer shaft having a first end and a second end;
    an inner shaft adjustably coupled to the outer shaft, wherein the inner shaft extends from the first end of the outer shaft;
    a mounting rod pivotally attached to the inner shaft and removably coupled to the mannequin component, wherein the mounting rod includes a plurality of attachment nubs spaced apart from each other along a length of the mounting rod, and wherein the plurality of attachment nubs are further angularly spaced apart from each other with respect to a central axis of the mounting rod; and
    a release button disposed on the mounting rod, wherein the release button, upon actuation, is configured to move each of the plurality of attachment nubs from an extended position to a retracted position to allow the mannequin component to be movable relative to the mounting rod,
    a swivel grip configured to rotate the outer shaft, wherein the swivel grip extends from the first end of the outer shaft;
    a pedal configured to adjust a height of the outer shaft relative to a supporting surface; and
    a hook configured to removably secure one or more weighted members to the outer shaft, wherein the hook extends from the second end of the outer shaft.

2. The support device of claim 1, wherein, in the extended position, each of the plurality of attachment nobs extends from a surface of the mounting rod, and wherein, in the retracted position, each of the plurality of attachment nobs is disposed within the mounting rod.

3. The support device of claim 1, further comprising a handle extending from the inner shaft, wherein the handle is configured to pivotally adjust the mounting rod relative to the inner shaft.

4. The support device of claim 1, further comprising a tripod adjustably coupled to the outer shaft.

5. The support device of claim 1, further comprising a clamp adjustably coupled to the outer shaft at the second end thereof, wherein the clamp is configured to secure the outer shaft to an external component.

6. The support device of claim 1, wherein the mounting rod is pivotally attached to the inner shaft via a ball joint.

7. A mannequin assembly comprising:
    a mannequin component including a cavity defining a plurality of openings;
    an outer shaft having a first end and a second end, wherein the outer shaft is oriented vertically with respect to a supporting surface;
    an inner shaft adjustably coupled to the outer shaft, wherein the inner shaft extends from the first end of the outer shaft;
    a mounting rod pivotally attached to the inner shaft and removably received within the cavity of the mannequin component, wherein the mounting rod includes a plurality of attachment nubs spaced apart from each other, and wherein each of the plurality of attachment nubs is removably received within a corresponding opening of the plurality of openings of the mannequin component; and a release button disposed on the mounting rod, wherein the release button, upon actuation, is configured to move each of the plurality of attachment nubs from an extended position to a retracted position to allow the mannequin component to be movable relative to the mounting rod;

a swivel grip configured to rotate the outer shaft, wherein the swivel grip extends from the first end of the outer shaft; and a pedal configured to adjust a height of the outer shaft relative to the supporting surface.

8. The mannequin assembly of claim 7, wherein, in the extended position, each of the plurality of attachment nobs extends from a surface of the mounting rod, and wherein, in the retracted position, each of the plurality of attachment nobs is disposed within the mounting rod.

9. The mannequin assembly of claim 7, further comprising a handle extending from the inner shaft, wherein the handle is configured to pivotally adjust the mounting rod relative to the inner shaft.

10. The mannequin assembly of claim 7, wherein the plurality of attachment nubs are spaced apart from each other along a length of the mounting rod, and wherein the plurality of attachment nubs are further angularly spaced apart from each other with respect to a central axis of the mounting rod.

11. The mannequin assembly of claim 7, further comprising a tripod adjustably coupled to the outer shaft.

12. The mannequin assembly of claim 7, further comprising a clamp adjustably coupled to the outer shaft at the second end thereof, wherein the clamp is configured to secure the outer shaft to an external component.

13. A support device for use with a mannequin component, the support device comprising:

an outer shaft having a first end and a second end;

a tripod adjustably coupled to the outer shaft;

an inner shaft adjustably coupled to the outer shaft, wherein the inner shaft extends from the first end of the outer shaft;

a mounting rod pivotally attached to the inner shaft and removably coupled to the mannequin component, wherein the mounting rod includes a plurality of attachment nubs spaced apart from each other along a length of the mounting rod, and wherein the plurality of attachment nubs are further angularly spaced apart from each other with respect to a central axis of the mounting rod;

a handle extending from the inner shaft, wherein the handle is configured to pivotally adjust the mounting rod relative to the inner shaft; and a release button disposed on the mounting rod, wherein the release button, upon actuation, is configured to move each of the plurality of attachment nubs from an extended position to a retracted position to allow the mannequin component to be movable relative to the mounting rod; and a swivel grip configured to rotate the outer shaft, wherein the swivel grip extends from the first end of the outer shaft.

14. The support device of claim 13, wherein, in the extended position, each of the plurality of attachment nobs extends from a surface of the mounting rod, and wherein, in the retracted position, each of the plurality of attachment nobs is disposed within the mounting rod.

\* \* \* \* \*